(12) United States Patent
Kimmel et al.

(10) Patent No.: US 8,760,401 B2
(45) Date of Patent: Jun. 24, 2014

(54) SYSTEM AND METHOD FOR USER OBJECT SELECTION IN GEOGRAPHIC RELATION TO A VIDEO DISPLAY

(76) Inventors: Ron Kimmel, Haifa (IL); Alexander Bronstein, San Jose, CA (US); Michael Bronstein, Santa Clara, CA (US)

( * ) Notice: Subject to any disclaimer, the term of this patent is extended or adjusted under 35 U.S.C. 154(b) by 1309 days.

(21) Appl. No.: 12/107,008

(22) Filed: Apr. 21, 2008

(65) Prior Publication Data

US 2009/0262075 A1 Oct. 22, 2009

(51) Int. Cl.
*G06F 3/033* (2013.01)
(52) U.S. Cl.
USPC ............ 345/163; 345/156; 345/157; 345/158; 348/734; 250/200; 250/493.1; 250/495.1; 353/10; 353/30
(58) Field of Classification Search
USPC ................. 345/156–157, 163, 204, 156–158; 348/734; 434/22; 353/10, 30; 250/200, 250/493.1, 495.1
See application file for complete search history.

(56) References Cited

U.S. PATENT DOCUMENTS

| | | | | |
|---|---|---|---|---|
| 4,813,682 A | * | 3/1989 | Okada | 463/5 |
| 5,194,008 A | * | 3/1993 | Mohan et al. | 434/22 |
| 5,926,168 A | * | 7/1999 | Fan | 345/158 |
| 6,446,099 B1 | * | 9/2002 | Peairs | 715/210 |
| 7,438,215 B2 | * | 10/2008 | Silverbrook et al. | 235/375 |
| 2005/0249391 A1 | * | 11/2005 | Kimmel et al. | 382/128 |
| 2006/0061566 A1 | * | 3/2006 | Verma et al. | 345/419 |
| 2006/0277571 A1 | * | 12/2006 | Marks et al. | 725/37 |
| 2007/0098255 A1 | * | 5/2007 | Yokono | 382/159 |

* cited by examiner

*Primary Examiner* — Shaheda Abdin
(74) *Attorney, Agent, or Firm* — Stephen E. Zweig

(57) ABSTRACT

The invention is directed to a system and method for determining position and orientation with respect to a display device. In particular, the invention is directed to acquiring an observed image from a display device using a pointing device, and calculating pointing device position and orientation using the acquired observed image and a displayed image on the display device.

41 Claims, 16 Drawing Sheets

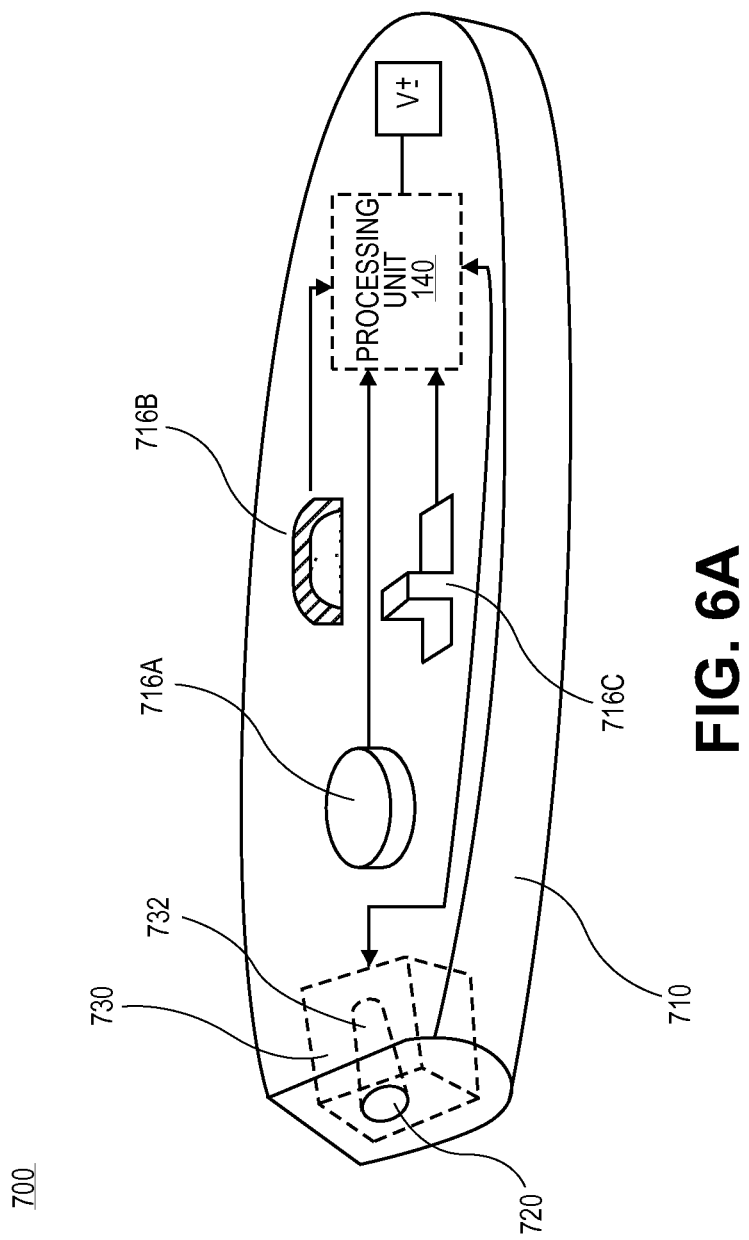

SYSTEM AND METHOD FOR USER OBJECT SELECTION IN GEOGRAPHIC RELATION TO A VIDEO DISPLAY

BACKGROUND OF THE INVENTION

Interactive devices are commonly used in conjunction with displays for interfacing purposes. For example, pointing devices commonly known as pointers are often used as presentation tools in classes, lectures, and meetings. A pointer may emit a bright mark onto a screen, thus illuminating a particular point or area of interest on the displayed image or document, and aiding in clarifying the presenter's discussion.

As another example, the pointing device known as a mouse is commonly used with the modern computer system. A mouse functions by detecting two-dimensional motion relative to its supporting surface. A screen cursor, corresponding to the movement of the mouse, is displayed on the screen, so as to aid the user in ascertaining the intended position and direction of movement on the screen. A user may navigate the cursor using the mouse, and select or maneuver screen objects via activating one or more buttons on the mouse.

As a further example, in the world of video gaming, the use of a pointing device has become a common method of interfacing between a video game player and the game environment. A popular pointing device is known as the light gun, many variations of which have been produced. A typical light gun contains a gun-shaped housing with a trigger, which a user may point and shoot toward an on-screen target. The game system then determines whether the target was hit or missed by the shot, and may display an on-screen response accordingly.

Traditionally, light guns were designed for use with cathode ray tube (CRT) monitors. In operation, an image on a CRT monitor is "painted" by a scanning electron beam moving across the screen on a horizontal line from left to right, and line by line from top to bottom. Upon reaching the right end of a line, the beam must move back to the left and down one line in order to begin painting the next horizontal line. The movement back to the left side of the next line is referred to as a "horizontal retrace." Upon reaching the right end of the bottom line, the beam must move back up to the upper left corner of the screen to begin another trace pattern. This movement back to the upper left is referred to as a "vertical retrace." Similarly, a "horizontal retrace signal" or "vertical retrace signal" instructs the system to move the beam back to the left of the next line, or upper left corner, respectively. The screen image as a whole appears instantaneously to the human eye as a result of visual persistence of the eye, since the movement is performed very quickly.

When a user pulls the trigger of a light gun, the system may employ either of two methods to ascertain whether the gun is aimed at the target. Upon the trigger being activated, the computer connected to the gun is notified and blanks the CRT screen to black. At this point, the gun begins receiving light through a photodiode in its barrel. A first method entails painting the target object white. If the photodiode senses darkness after one vertical retrace signal, followed by light after the next, the computer recognizes this pattern to indicate a hit target. In a second method, the entire screen and not just the target is painted white. By relating the photodiode signal with the horizontal and vertical retrace signals, the computer determines the location on the screen at which the gun is pointed when its photodiode first senses light (i.e., when the trigger is pulled).

The traditional light gun described above is thus operable as a game interfacing device only when CRT screens are used. Users, however, may wish to use various types of screens such as LCD, plasma, or other displays. Indeed, many forms of television and computer monitors that employ simultaneous refreshing of pixels, and thus no retracing, have become popular in recent years. The traditional light gun thus cannot be used with these monitors, since the display timing method of tracking a target, as described above, is irrelevant outside the context of traditional CRT beam-scanning.

An alternative method of gun interfacing, such as that used in the Nintendo Wii, entails the use of a separate light-emitting apparatus placed, for example, near or adjacent to the display screen. The apparatus emits light to be received by a sensor in the gun, while a user aiming the gun toward the screen pulls the gun trigger. The light-emitting apparatus may be formed as a bar on which lights are placed at both ends. Prior to game play, the user must calibrate the system to recognize the screen position at which the user is pointing, relative to the various lights on the light-emitting apparatus. During game play, a method such as triangulation may then be used to calculate the user's position with respect to the screen.

Although the method above may be compatible with non-CRT screens, certain drawbacks can occur. For example, the necessity of a light-emitting bar inevitably entails a limited viewing (pointing) angle for the gun sensor. In addition, the use of this additional piece of hardware requires a more complicated setup process, including the mounting, positioning, and calibration of the bar. The required calibration may also lend to some difficulty in maintaining accuracy should a user decide to drastically change default positions.

Another method employs a tracking camera placed above the screen. The camera keeps track of two light sources on the gun itself. In this method as well, the system must be re-calibrated to maintain accuracy when the user changes his shooting position, distance, or style.

Hence, it is desirable to have a solution without the above-described disadvantages. As will be seen, the invention provides such a solution in an elegant manner.

BRIEF DESCRIPTION OF THE DRAWINGS

FIG. 6A is a diagrammatic view of an embodiment of a pointing device configured according to the invention;

DETAILED DESCRIPTION OF THE INVENTION

The invention is directed to a system and method for determining position and orientation with respect to a display device. Although various embodiments are disclosed, the preferred embodiment will be dependent on the manufacturability, practicality, cost, and other factors of a given application. Further, the invention is not limited to the embodiments disclosed.

In particular, the invention is directed to acquiring an observed image from a display device using a pointing device equipped with a sensor, and calculating pointing device position and orientation using the acquired observed image and a displayed image on the display device. Calculating the position and orientation may include correlating the displayed image with the acquired observed image to generate correlation data, and then computing pointing device position and orientation using the correlation data. This correlation data may include correspondence between a pixel of the displayed image and a pixel of the acquired observed image, and a criterion of reliability of the correspondence. The correlating and the computing may or may not be performed remotely from the acquiring, and the correlating and computing may or may not be performed together.

Correlating the displayed image with the acquired observed image may include detecting or extracting, for example, using a Smallest Univalue Segment Assimilating Nucleus (SUSAN) invariant feature detector, scale-space method, etc., a first set of features from the observed image and a second set of features from the displayed image, where the features may include dominant features. A descriptor may then be computed, for example, using a scale-invariant feature transform (SIFT), for each feature of the first and second sets of features.

The first set of features may be matched, for example, by applying a RANdom Sample Consensus (RANSAC) algorithm, with the second set of features based on the descriptor for each feature.

A feature from one of the first and second sets of features may then be tracked in time. This may entail applying, for example, an optical flow algorithm such as a Kanade-Lucas algorithm, or other methods. Further, the calculated pointing device position and orientation may be translated into a local system of coordinates on the display device.

In addition, input data may be acquired based on a user action, and output data calculated based on the input data. Based on the calculated output data, a response action such as displaying image data may then be performed.

Figure 1:
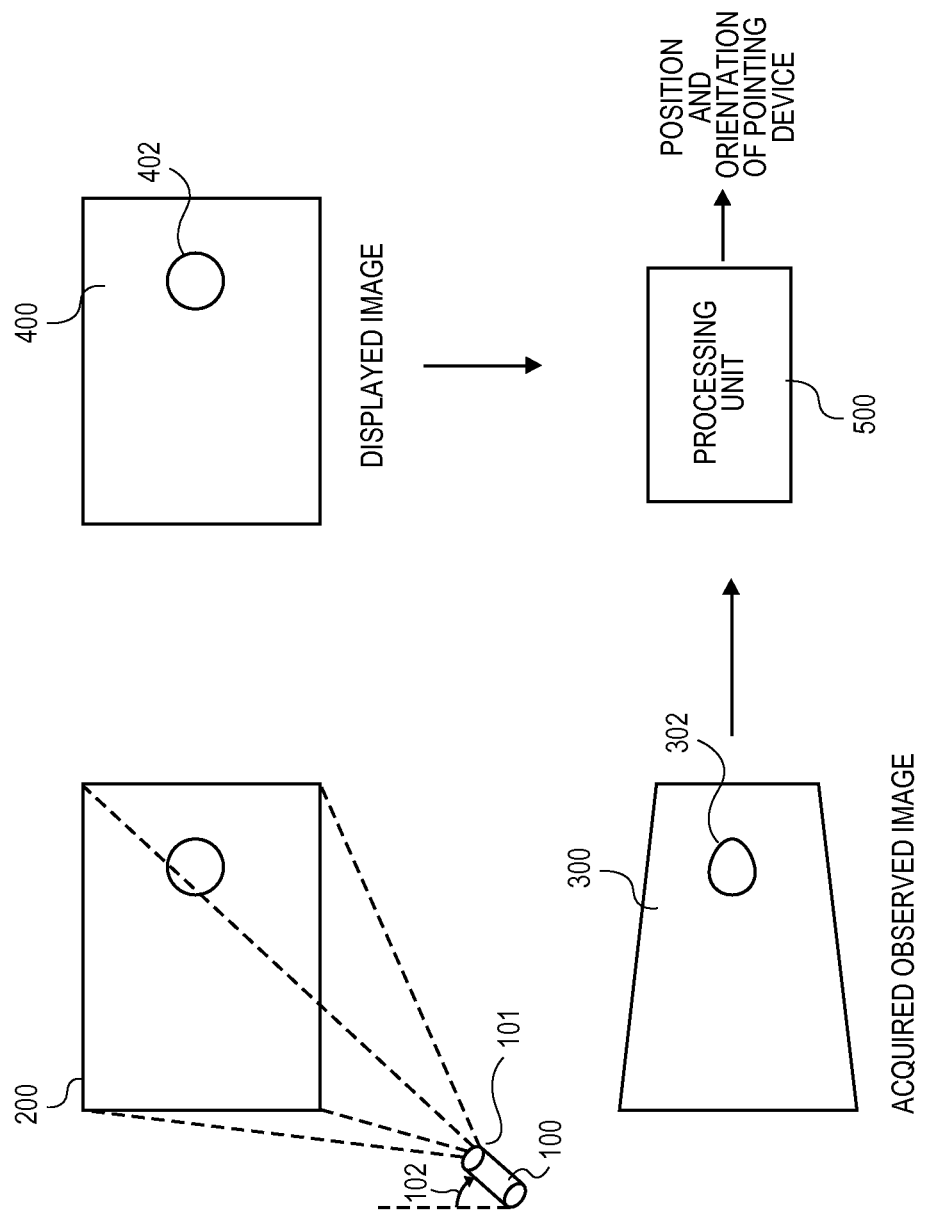
FIG. 1 is a diagrammatic view of an embodiment of a system configured according to the invention.

FIG. 1 depicts the use of a pointing device 100 according to the invention. Pointing device 100 may be aimed toward a display device such as screen 200. Pointing device 100 may acquire observed image 300 from the point of view of position 101 and orientation 102, from which pointing device 100 aims at screen 200. Pointing device 100 may then transmit the acquired observed image 300 to processing unit 500. Processing unit 500 may also obtain displayed image 400. Processing unit 500 may then use acquired observed image 300 and displayed image 400 to calculate the position 101 and orientation 102 of pointing device 100.

Figure 2:
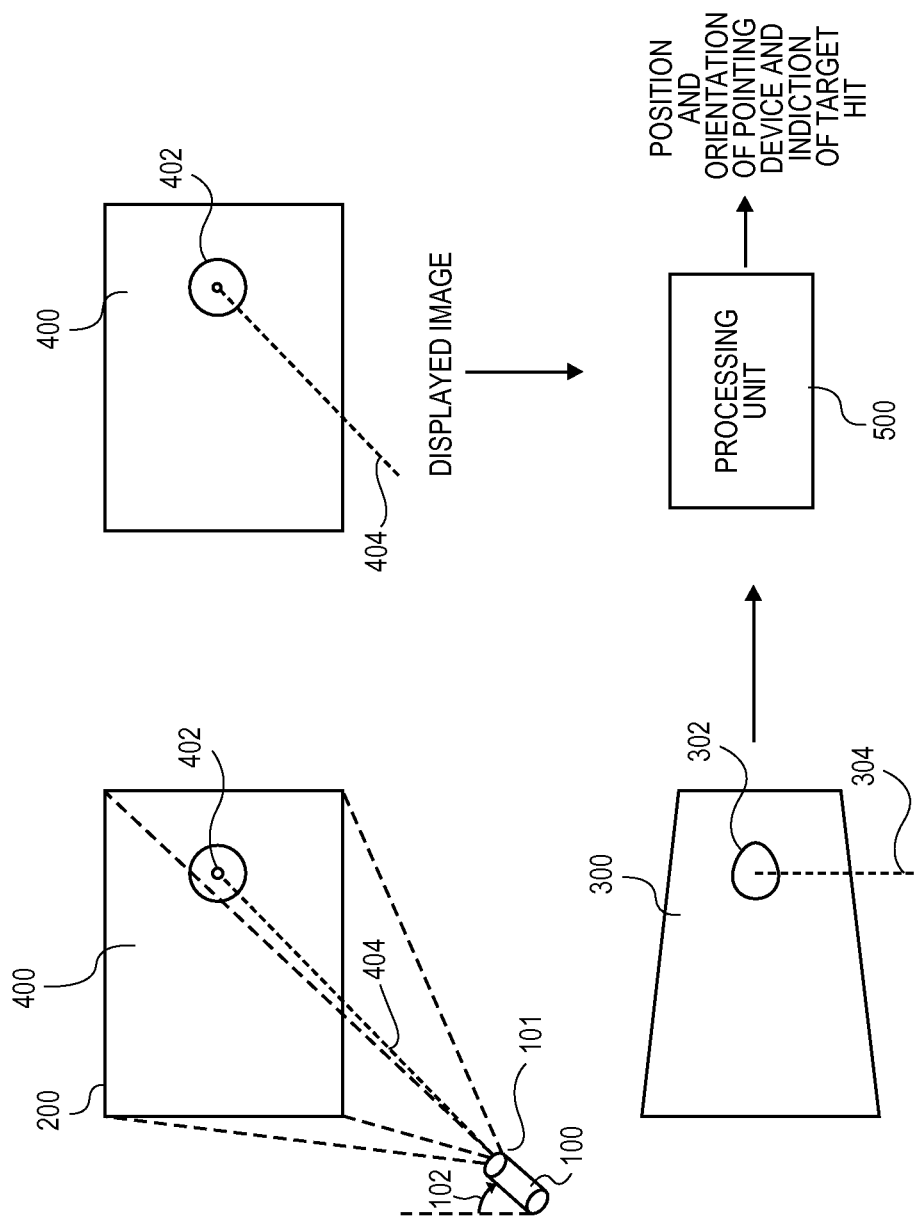
FIG. 2 is a diagrammatic view of an embodiment of a system configured according to the invention.

Referring to FIG. 2, a line of sight 404 of a user aiming a pointing device directly forward is illustrated as a dotted line from pointing device 100 to hypothetical target 402. From the user's perspective of the observed image, if the user is aiming pointing device 100 accurately at target 402, the line of sight would extend directly forward from the user to the target 402. Hence, from the point of view of the user, reflected in the observed image 300 acquired by pointing device 100, the line of sight 304 from the user extends directly forward to observed target 302 of the observed image 300.

In one embodiment of the invention, a user may input an action via the pointing device 100, such as but not limited to pointing, shooting, striking, pushing, and pulling, that triggers the pointing device 100 to acquire an observed image 300 from screen 200. Through the method described above, processing unit 500 may calculate the position 101 and orientation 102 of pointing device 100. The processing unit 500 may further calculate an indication, based on position 101 and orientation 102, of whether a target, such as target 402, was successfully hit.

Figure 3A:
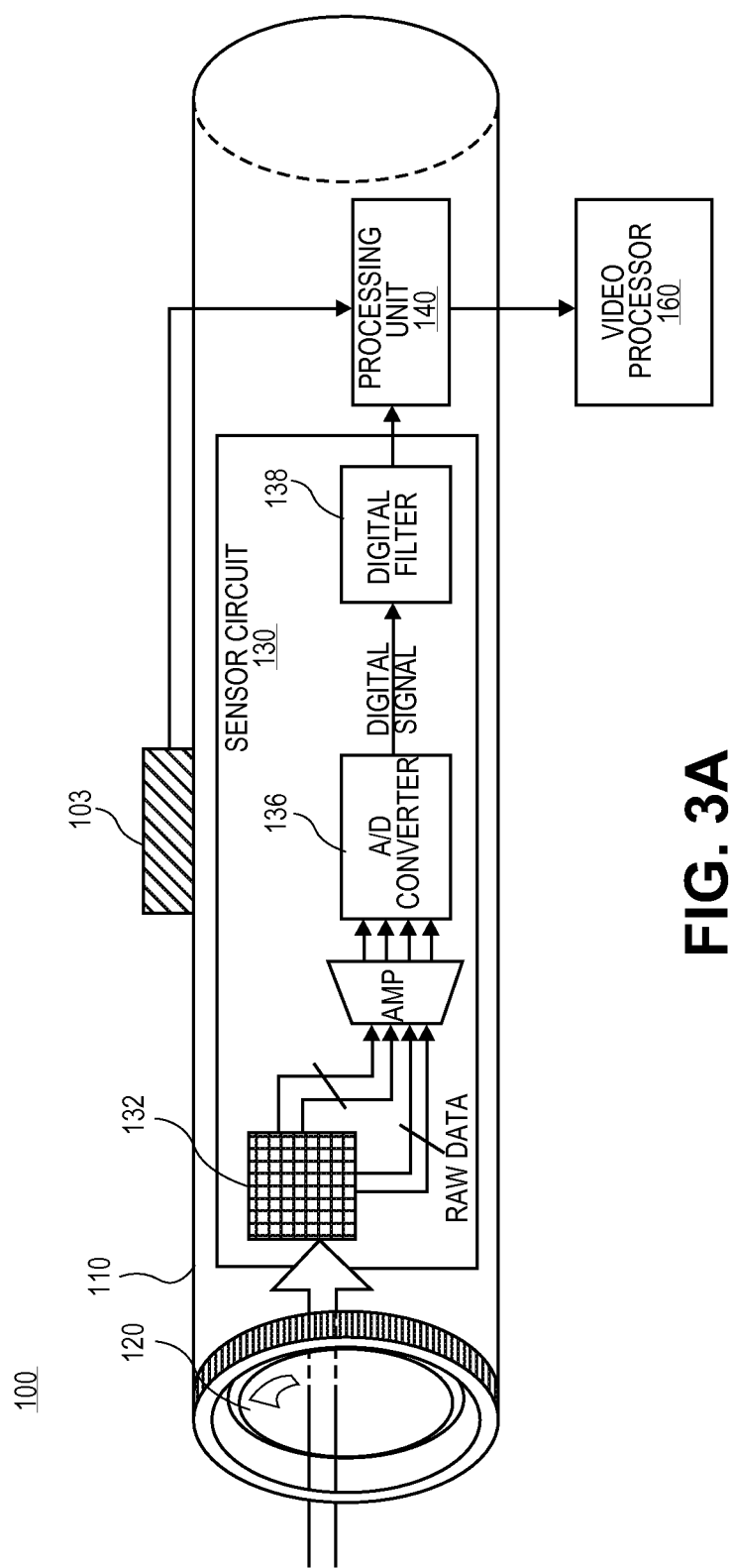
FIG. 3A is a diagrammatic view of an embodiment of a pointing device configured according to the invention.

As shown in FIG. 3A, an embodiment of pointing device 100 may include housing 110. Lens 120 may be disposed at, for example, an end of housing 110. Light from an image may pass through the lens 120 to optical sensor chip 132. Sensor chip 132 may be a component of sensor circuit 130, which may further include amplifier 134, to which the sensor may transmit raw image data, A/D converter 136, to which the amplifier may transmit the data and from which the data is output as a digital signal to digital filter 138. The sensor circuit 130 may then output the image data to processing unit 140.

Figure 3B:
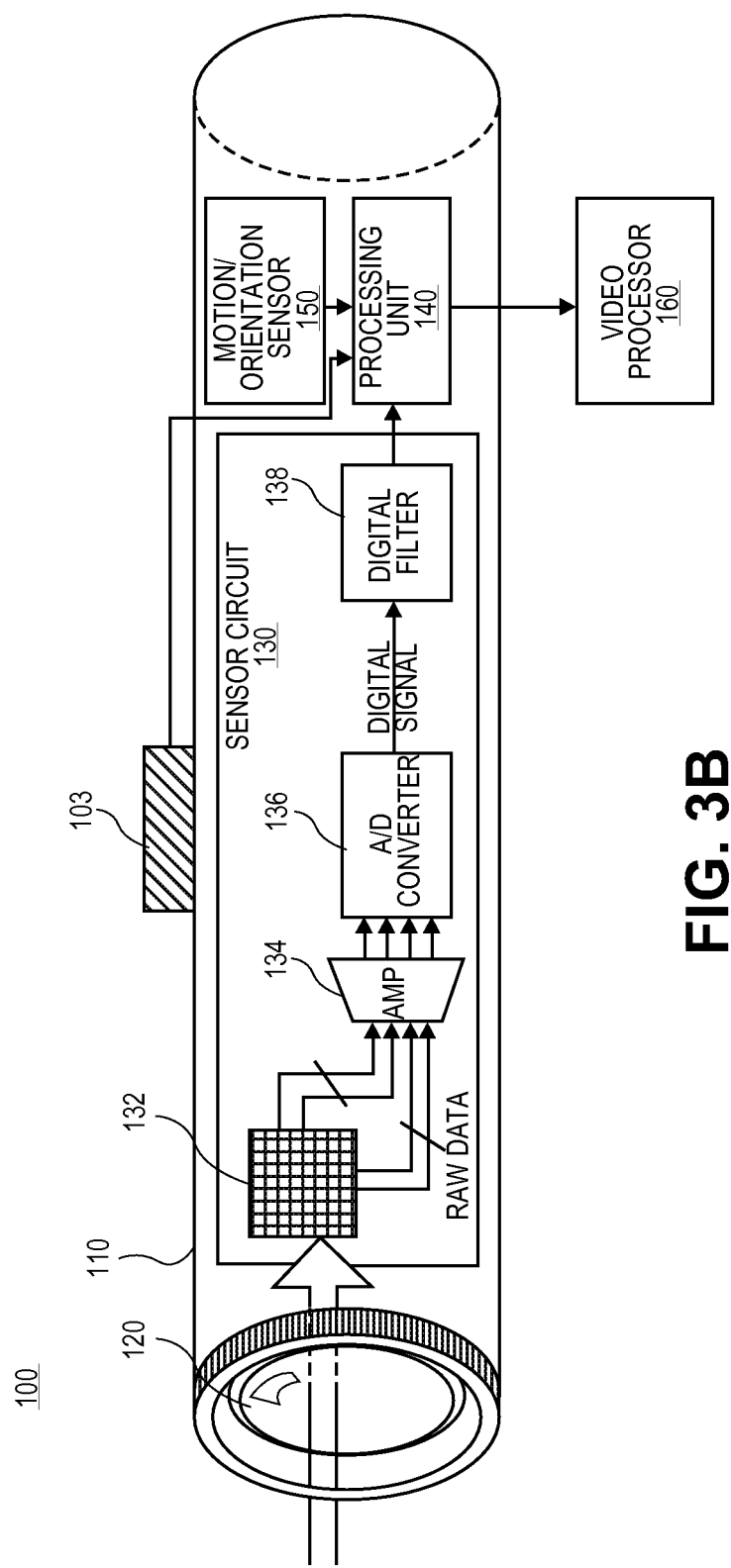
FIG. 3B is a diagrammatic view of an embodiment of a pointing device configured according to the invention.

A trigger 103 may be disposed on the housing. Upon trigger 103 being activated, a signal may be transmitted to the processing unit 140, upon which, for example, the processing unit 140 may notify sensor circuit 130 to acquire an image. Alternatively, sensor circuit 130 may automatically acquire image data, and upon trigger 103 being activated, a signal may be transmitted to the processing unit 140 to process the current image data. In addition, as shown in FIG. 3B, pointing device 100 may include a motion or orientation sensor as known to one of ordinary skill in the art, such as an accelerometer or gyroscope, that also transmits data to processing unit 140.

Processing unit 140 may be disposed within housing 110 of pointing device 100 as shown. Alternatively, it may be independent of pointing device 100, in which case sensor circuit 130 may transmit data to processing unit 140 via a wired or wireless connection. Processing unit 140 may include, for example, simple combinatorial logic, or more complex devices such as a programmable microprocessor. The microprocessor may be a specialized or dedicated microprocessor that is configured to perform particular tasks by executing machine-readable software code that defines the particular tasks. The microprocessor may also be configured to operate and communicate with other devices such as direct memory access modules, memory storage devices, Internet related hardware, and other devices that relate to the transmission of data in accordance with the invention. The software code may be configured using software formats such as Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention.

Within the different types of computers, such as computer servers, that may utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such computers for maintaining information that is frequently retrieved by a central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. The invention is not limited to any particular type of memory device, or any commonly used protocol for storing and retrieving information to and from these memory devices respectively.

Processing unit 140 may perform one or more of a variety of processes, such as those disclosed below in reference to FIGS. 7-12, using the data it receives via one or more channels. Upon completion of a process, processing unit 140 may transmit output data to a video processing system 160, via a wired or wireless connection. Optionally, processing unit 140 may include an integrated clock for synchronization with video processing unit 160.

Figure 4:
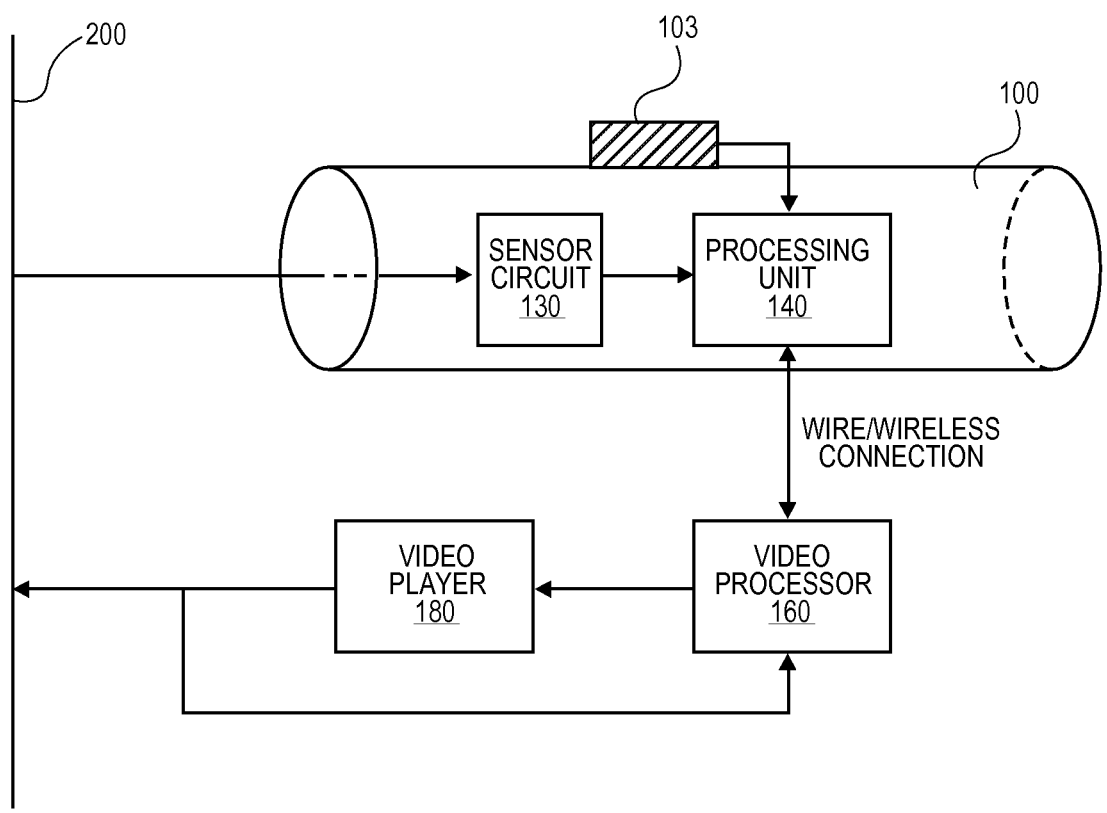
FIG. 4 is a diagrammatic view of an embodiment of a system configured according to the invention.

As illustrated in FIG. 4, pointing device 100 may transmit a wired or wireless signal from processing unit 140 to video processor 160. The signal may include image, time, or other data, and may be automated or triggered by a user action performed upon trigger 103 via such as but not limited to pointing, shooting, striking, pushing, and pulling. Video processor 160 may be employed for various functions such as editing, time/date stamping, and otherwise processing the data related to the acquired image. Video player 180 may be used to play content such as games, presentations, movies, and other video data stored within the system or, for example, on DVDs, VCDs, and game cartridges. Video player 180 may transmit to video processor 160 data related to a displayed image. Video processor 160 may use the acquired image data from processing unit 140 and the displayed image data from video player 180 to perform processes such as those described below in reference to FIGS. 7-13. Alternatively, video processor 160 may transmit data to processing unit 140, and processing unit 140 may perform processes such as those described below in reference to FIGS. 7-13. In addition, video processor 160 may also transmit to video player 180 a signal to display a particular response, or to processing unit 140 a signal for pointing device 100 to perform a particular response.

Alternatively, processing unit 140 or video player 180 may be appended to or combined with video processor 160. One or both of processing unit 140 and video processor may be either internal or external to pointing device 100.

Figure 5:
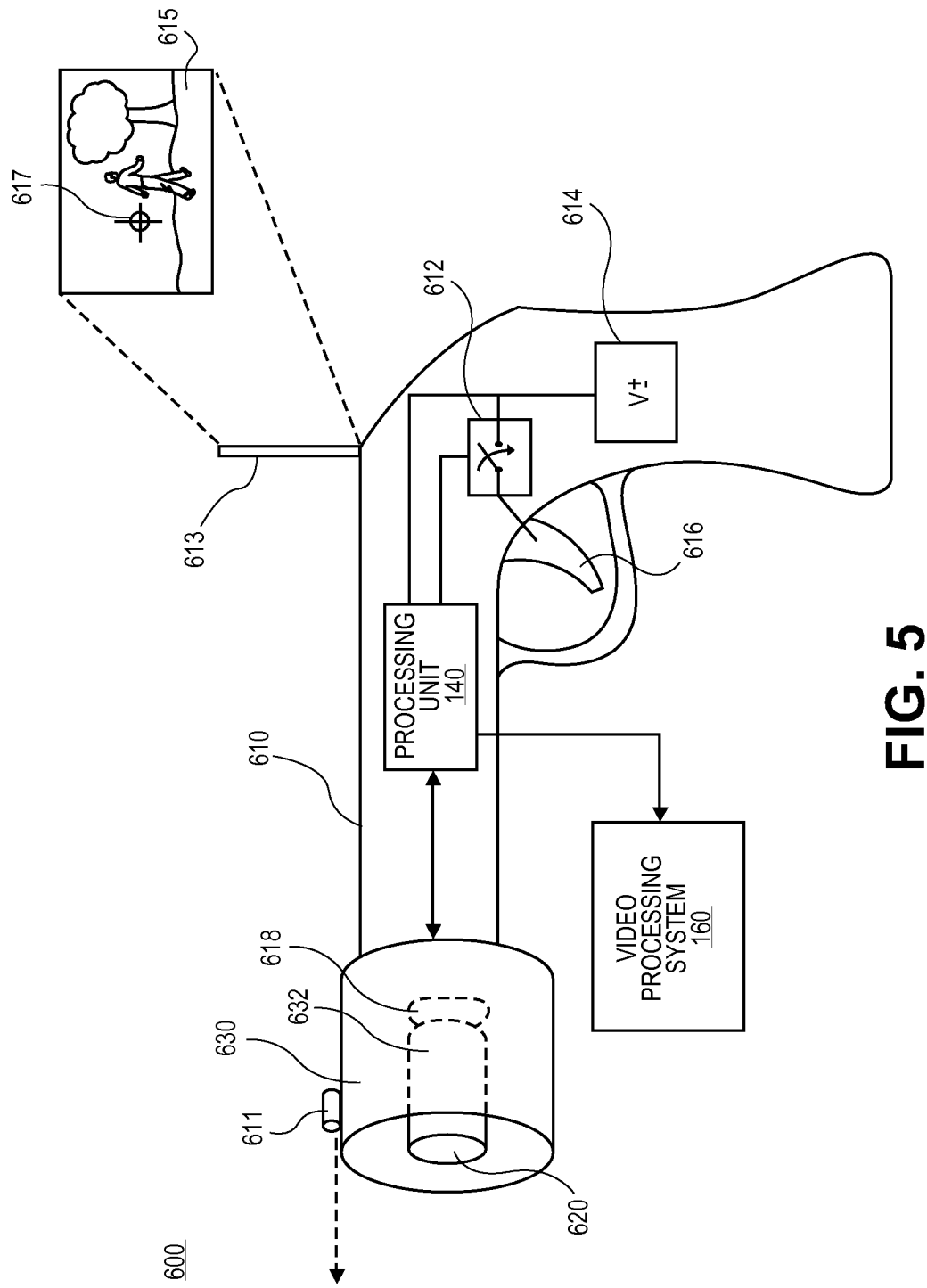
FIG. 5 is a diagrammatic view of an embodiment of a pointing device configured according to the invention.

FIG. 5 illustrates a pointing device in the form of a toy gun 600. Toy gun 600 may include lens 620 and sensor circuit 630 with sensor chip 632 disposed, for example, in or about an end of housing 610. Sensor circuit 630 may transmit data to processing unit 140. Processing unit 140 may be disposed within housing 610 as shown, or it may be independent of toy gun 600, in which case sensor circuit 630 may transmit data to processing unit 140 via a wired or wireless connection. Processing unit 140 may also be coupled to switch 612 and power supply 614. Switch 612 may be closed by, for example, the pulling of trigger 616, thus signaling to processing unit 140 a desired shooting of a target on a screen. Processing unit 140 may then activate sensor circuit 630 to, for example, capture an image.

Toy gun 600 may optionally include a focus mechanism 618, configured to be controlled manually, or to focus lens 620 automatically. In addition, a laser pointer 611 may be disposed within or about housing 610 and configured to project a laser mark onto an object, such as a screen, toward which the toy gun 600 is pointed. The laser mark may be in the form of a point, crosshairs, or any other designating shape. In addition to or in place of the laser pointer 611, a gun sight (not shown) or other means for assisting in proper aim may also be employed. The mark may be automatically projected or otherwise controlled, such as by a slight pull of the trigger 616, or by a switch independent of the trigger 616. The projected mark may be in the form of one of various shapes, such as but not limited to a dot, circle, or "X" mark.

In addition to or in conjunction with laser pointer 611, a preview screen 613, such as but not limited to an LCD screen, may be disposed about housing 610 to provide a preview 615 of the currently observed image, up close to the user's vision. Preview 615 may also include a target indication 617, indicating the position of the potential strike given the user's current aim. Preview screen 613 may optionally be adjustable to different angles and/or rotations, including a vertical position as shown, as well as a horizontal position should the user elect to position the screen flat and substantially out of his or her line of sight.

FIG. 6A illustrates another embodiment of a pointing device 700. Pointing device 700 may include lens 720 and sensor circuit 730 with sensor chip 732 disposed, for example, in or about an end of housing 710. Sensor circuit 730 may transmit data to processing unit 140. Processing unit 140 may be disposed within housing 710 as shown, or it may be independent of pointing device 700, in which case sensor circuit 730 may transmit data to processing unit 140 via a wired or wireless connection. Processing unit 140 may activate sensor circuit 730 based on a user action performed on pointing device 700 via a trigger such as, for example, push button 716A, scroll button 716B, or toggle button 716C.

Figure 6B:
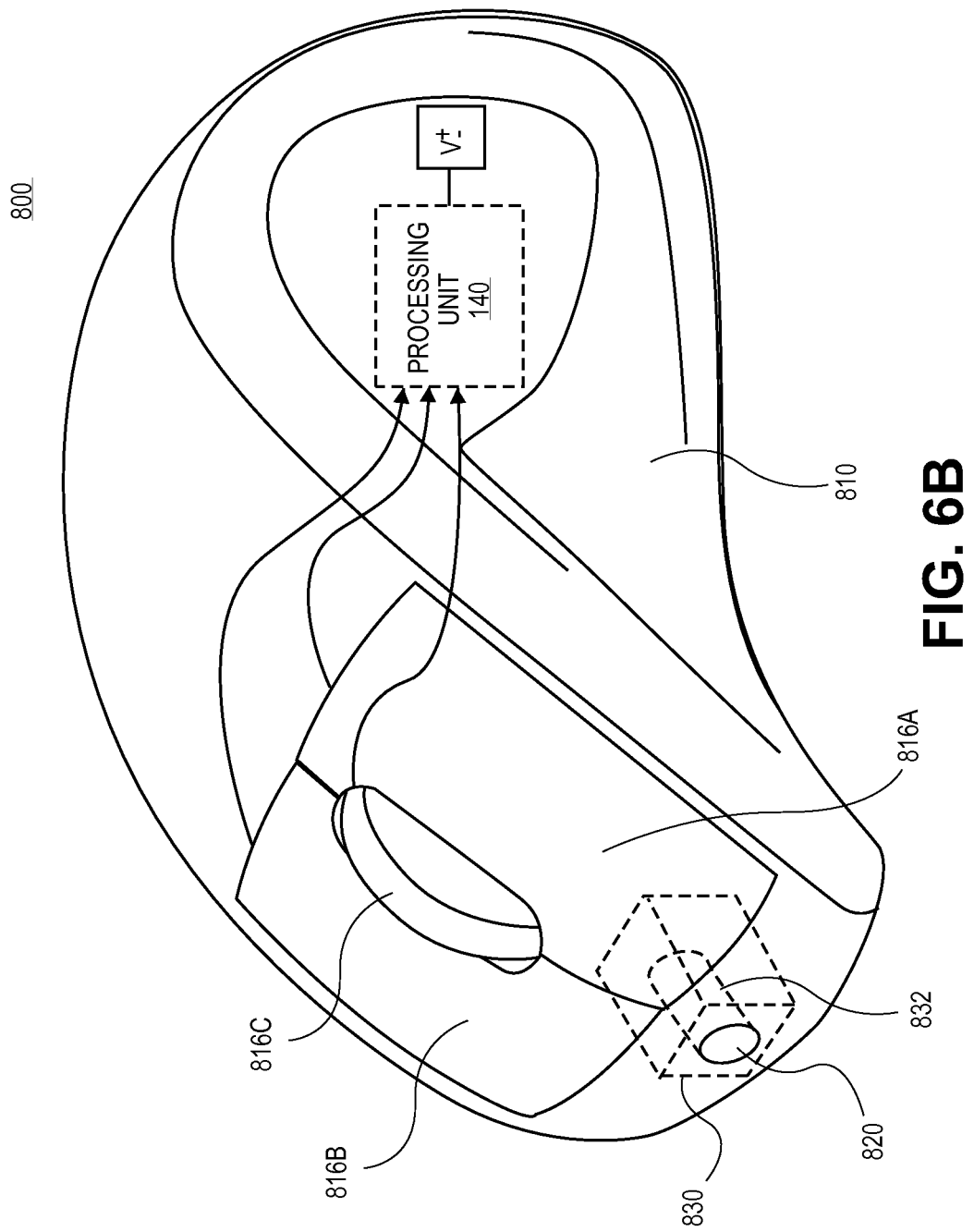
FIG. 6B is a diagrammatic view of an embodiment of a pointing device configured according to the invention.

FIG. 6B illustrates another embodiment of a pointing device in the form of a traditional computer mouse 800. Mouse 800 may include lens 820 and sensor circuit 830 with sensor chip 832 disposed, for example, in or about an end of housing 810. Sensor circuit 830 may transmit data to processing unit 140. Processing unit 140 may be disposed within housing 810 as shown, or it may be independent of pointing device 800, in which case sensor circuit 830 may transmit data to processing unit 140 via a wired or wireless connection. Processing unit 140 may activate sensor circuit 830 based on a user action performed on pointing device 800 via a trigger such as, for example, left-click button 816A, right-click button 816B, or scroll button 816C.

Figure 7:
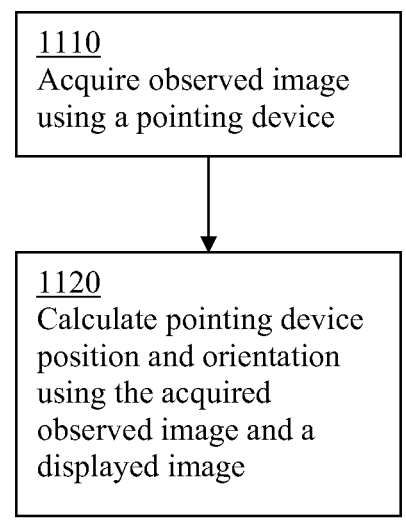
FIG. 7 is a flow diagram of an embodiment of a method configured according to the invention.

Referring to FIG. 7, a flow chart 1100 illustrates an embodiment of a process for determining the position and orientation of a pointing device with respect to a display device. Beginning at step 1110, an observed image is acquired using a pointing device. In step 1120, the position and orientation of the pointing device are calculated using the acquired observed image and a known displayed image. This may be performed, for example, in a processing unit within a pointing device, or independently of the pointing device that acquires the observed image of step 1110.

Figure 8:
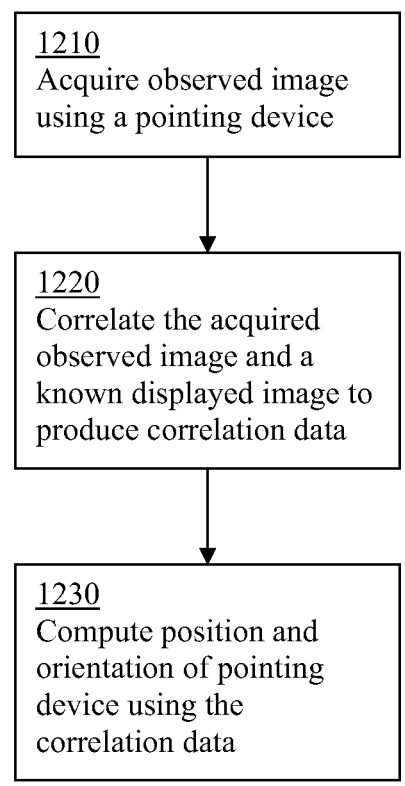
FIG. 8 is a flow diagram of an embodiment of a method configured according to the invention.

Referring to FIG. 8, a flow chart 1200 illustrates another embodiment of a process for determining the position and orientation of a pointing device with respect to a display device. Beginning at step 1210, an observed image is acquired using a pointing device. In step 1220, the acquired observed image and a known displayed image are correlated to produce correlation data. Then in step 1230, the correlation data is used to compute the position and orientation of the pointing device. Step 1220 of correlating and step 1230 may be performed together or separately. They may also be performed, for example, in a processing unit within a pointing device, or independently of the pointing device that acquires the observed image of step 1210.

Figure 9:
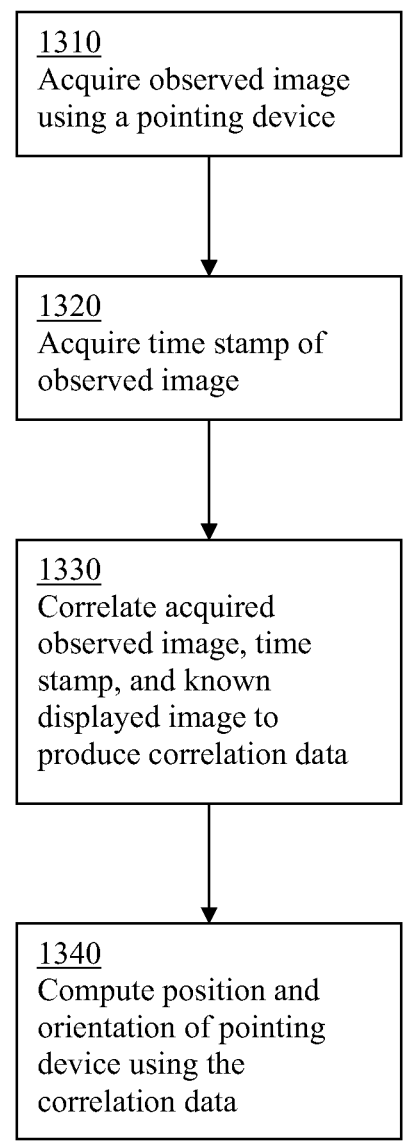
FIG. 9 is a flow diagram of an embodiment of a method configured according to the invention.

Referring to FIG. 9, a flow chart 1300 illustrates another embodiment of a process for determining the position and orientation of a pointing device with respect to a display device. Beginning at step 1310, an observed image is acquired using a pointing device. The time stamp of the observed image is also acquired in step 1320. In step 1330, the acquired observed image, time stamp, and a known displayed image are correlated to produce correlation data. Then in step 1340, the correlation data may be used to compute the position and orientation of the pointing device.

Figure 9B:
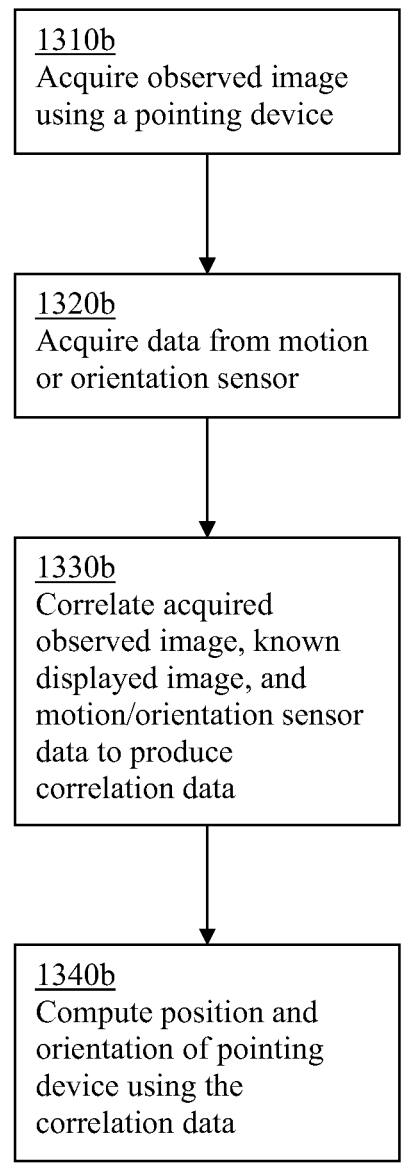
FIG. 9B is a flow diagram of an embodiment of a method configured according to the invention.

Alternatively, or in conjunction with process 1300, a motion or orientation sensor as known to one of ordinary skill in the art, such as an accelerometer or gyroscope, may transfer data to be received in step 1320*b*, shown in FIG. 9B. This data may be correlated, for example, in conjunction with the acquired observed image and displayed image, to produce correlation data. The correlation data may be used to compute the position and orientation of the pointing device.

Figure 10:
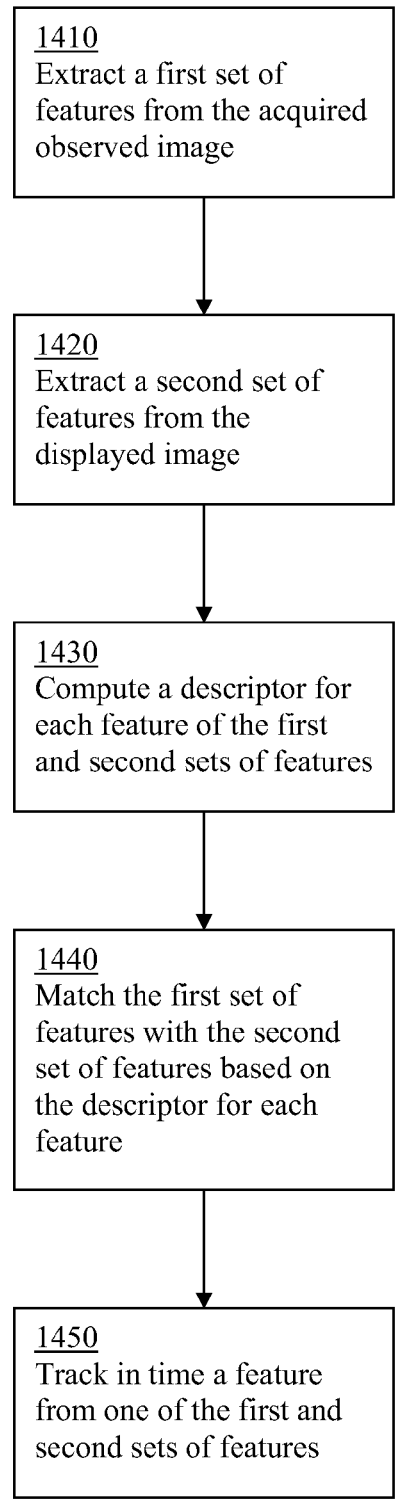
FIG. 10 is a flow diagram of an embodiment of a method configured according to the invention.

Flow chart 1400 of FIG. 10 illustrates an embodiment of a process for correlating a displayed image with an acquired observed image. Beginning in step 1410, a first set of feature indicia or points is extracted from the acquired observed image. In step 1420, a second set of feature indicia or points is likewise extracted from the displayed image. The feature indicia or points extracted may include dominant feature indicia or points of their respective images. The extracting may be performed by applying, for example, a Smallest Univalue Segment Assimilating Nucleus (SUSAN) invariant feature detector, as known to one of ordinary skill in the art and commonly used in the area of image analysis. A descriptor is then computed in step 1430 for each feature indicium or point of the first and second sets of feature indicia or points. This descriptor computation may be performed, for example, using a scale-invariant feature transform (SIFT), as known to one of ordinary skill in the art and commonly used in the area of image analysis. This may thus result in two sets of data; one for coordinates of points and another for descriptors of points: for example, $\{(x_i,y_i),f_i\}_{i=1}^{N}$ for a displayed image, and $\{(x_j, y_j),f_j\}_{j=1}^{M}$ for an acquired observed image.

In step 1440, the first set of feature points is matched with the second set of feature points based on the descriptor for each feature point. This step of matching may include applying a RANdom SAmple Consensus (RANSAC) algorithm, as known to one of ordinary skill in the art and commonly used in the area of image analysis, and using for example a set of observed data values, a parametric model, and confidence parameters. As an example, for each feature point in the first set, a feature point in the second set being a closest neighbor in a descriptor space may be found. A closest neighbor may be determined by a distance $d(f_i, f_j)$, where, for example, $d(f_i,f_j) = \|f_i - f_j\|$. A correspondence may then be rejected for a point, for which a ratio of distance in the descriptor space between a first nearest neighbor and a second nearest neighbor is larger than a threshold of, for example, 0.6~0.8. This will practically exclude correspondences with spurious and non-discriminative descriptors arising, for example, from specular (non-Lambertian) reflections. The distance, for example, $d(f_i,f_j)$, in the descriptor space may be one of Euclidean distance, cosine distance, weighted Euclidean distance with weights determined offline by Principal Components Analysis (PCA) on a training set, Mahalanobis distance, or a combination thereof, as known to one of ordinary skill in the art.

Additionally in step 1450, a feature point from one of the sets of feature points may be tracked in time via an optical flow algorithm, such as but not limited to a Kanade-Lucas algorithm.

Figure 11:
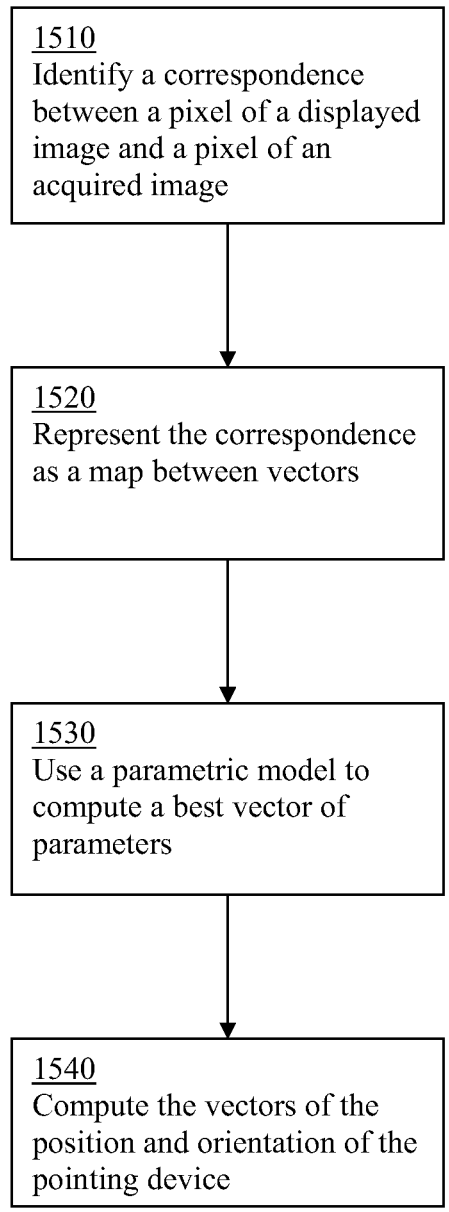
FIG. 11 is a flow diagram of an embodiment of a method configured according to the invention.

FIG. 11 illustrates a flow chart 1500 for an embodiment of a process of calculating pointing device position and orientation. First, at step 1510, correspondence is identified between a pixel of a displayed image and a pixel of an acquired image. A criterion of reliability of the correspondence may also be determined. The correspondence is then represented as a map between vectors in step 1520. In step 1530, a parametric model is used to compute a best vector of parameters, and then the vectors of the position and orientation of the pointing device are computed in step 1540.

For example, correspondence between the pixels the displayed image $I_d$ and the acquired observed image $I_o$ may be represented as a map between the vector of coordinates u in the displayed image domain and the vector of coordinates u' in the acquired image domain. Using a parametric model $T(u; \theta)$ dependent on the vector of parameters θ, coordinates u in the displayed image domain may be mapped into the vector of coordinates u' in the acquired image domain, so as to compute the best vector of parameters such that $u' \approx T(u; \theta)$. The computing of the best vector of parameters may be performed, for example, by solving the optimization problem $$\theta = \underset{\theta}{\operatorname{argmin}} \|T(u; \theta) - u'\|.$$

Vectors of the position and orientation, $x_p$ and $v_p$ respectively, of the pointing device may then be computed from the parameters θ.

The calculated position and orientation may represent that of, for example, a toy gun in a three-dimensional system of coordinates relative to a screen's position and scale. This calculated pointing device position and orientation may be also translated into a local system of coordinates on the display device, so as to represent respectively the toy gun's target point on the screen, and the orientation, with respect to the screen, of the ray extending that target point to the gun. The translated position may be expressed, for example, as a vector (x, y), and the orientation as a vector of azimuthal and elevation angles (θ,φ).

As another example, the process of calculating pointing device position and orientation may be performed by solving the inverse problem $$(x_p, v_p) = \underset{x_p, v_p}{\operatorname{argmin}} \|T(I_d; x_p, v_p) - I_o\|,$$

where $x_p$ and $v_p$ are vectors of the position and orientation of the pointing device, respectively, $I_d$ is the displayed image, $I_o$ is the acquired image, $\|\cdot\|$ is a norm, and T is a mapping describing how the displayed image is observed by the sensor in the pointing device as a function of the pointing device position and orientation. The mapping T may include a geometric transformation, such as an affine transformation, of the image coordinates, and a photometric transformation of the image pixel values. The inverse problem above may, for example, be solved after applying a transform to the displayed image $I_d$ and the acquired image $I_o$. This transform may include one or a combination of edge detection, frequency-domain (Fourier-like) transform, multiresolution (wavelet-type) transform, or local feature transform, as known to one of ordinary skill in the art.

Further, solving the inverse problem above may entail solving the parametric inverse problem $$\theta = \underset{\theta}{\operatorname{argmin}} \|T(I_d; \theta) - I_o\|,$$

where $\theta$ is a vector of parameters, $\|\cdot\|$ is a norm, T is a parametric mapping describing the how the displayed image is observed by the sensor in the pointing device as a function of the parameters $\theta$, $I_d$ is the displayed image, and $I_o$ is the acquired image; as well as computing the vectors of the position and orientation $x_p$ and $v_p$ of the pointing device from the parameters $\theta$.

Figure 12:
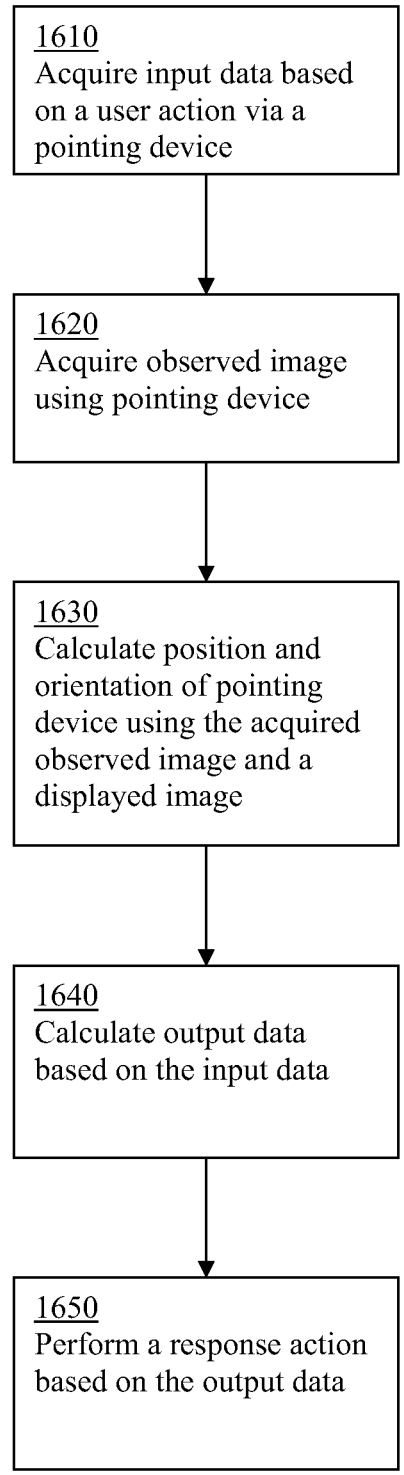
FIG. 12 is a flow diagram of an embodiment of a method configured according to the invention.

Referring to FIG. 12, a flow chart 1600 illustrates an embodiment of a process for determining the position and orientation of a pointing device with respect to a display device, and for outputting a response based on a user's action. Beginning at step 1610, input data is acquired based on a user action via a pointing device. The user action may include, for example, pointing, shooting, striking, pushing, or pulling, and may or may not be inferred from the motion of the pointing device. An observed image may then be acquired using the pointing device in step 1620. This observed image may include a scene of battle in which the user is engrossed, and perhaps a potential target at which the user has attempted to shoot via the input action. In step 1620, the position and orientation of the pointing device are calculated using the acquired observed image and a known displayed image. Whether the user hit or missed the attempted target may be determined based on this calculated position and orientation of, for example, his gun at the time of the input action (e.g., pulling the trigger). Based on the input data acquired in step 1610, output data is calculated in step 1640. The output data may include, for example, an indication of whether the target was hit. A response action is then performed in step 1650 based on the calculated output data. As an example, the response action may include displaying an image or sound of an explosion or a fallen target based on a "hit" indication. Had the user missed his target, for example, the response action may include displaying the words "missed," or may simply entail rendering no change to the subsequently displayed battle scene. Alternatively to or in conjunction with a displayed response, the response action may include rendering feedback via the pointing device itself, such as but not limited to a vibration or other tactile motion, an activated light, or an audio signal.

Figure 13:
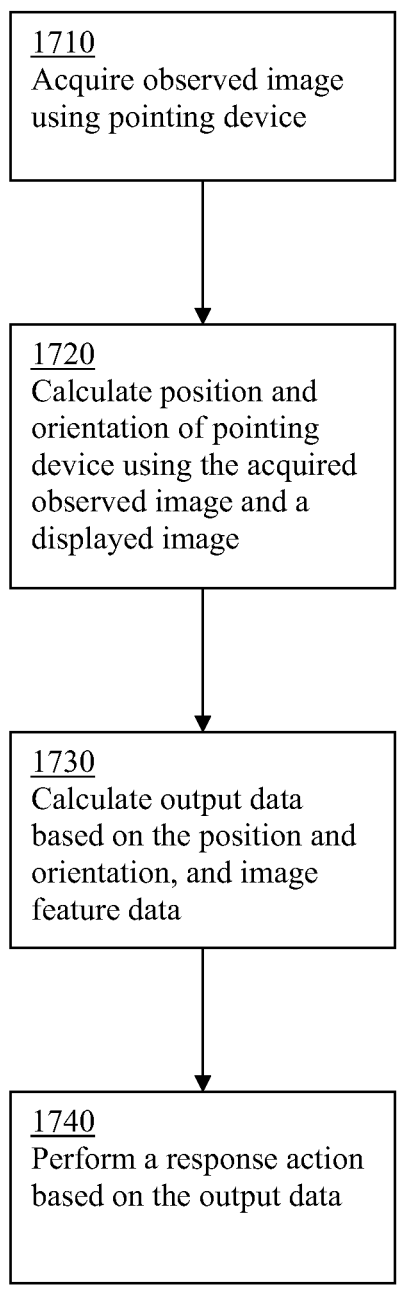
FIG. 13 is a flow diagram of an embodiment of a method configured according to the invention.

The determination of whether a target was hit may be performed as in step 1730 of FIG. 13, by utilizing image feature data, indicating for example whether a particular feature is a target or background (non-target) feature. The image feature data and/or displayed image may be stored within a particular processing unit such as processing unit 140 or video processor 160, or otherwise received from another source such as a video player 180. In conjunction with the pointing device position and orientation, which may be received or calculated within a particular processing unit such as processing unit 140 or video processor 160, the image feature data may be used to calculate output data. The output data may indicate, for example, a target hit or missed. Based on this output data, a response such as that described above in relation to FIG. 12 may be performed, or alternatively a signal indicating an appropriate response may be transmitted.

Thus, the invention provides a system and method for determining position and orientation with respect to a display device by, for example, acquiring an observed image from a display device using a pointing device, and calculating pointing device position and orientation using the acquired observed image and a displayed image on the display device. This has been illustrated in several embodiments that illustrate examples of applications of the invention in practical use situations. Although some of the above embodiments are described and illustrated in the context of video gaming, the scope of the invention extends to other applications where such functions are useful. Furthermore, while the foregoing description has been put forth with reference to particular embodiments of the invention, it will be appreciated that these are only illustrative of the invention and that changes may be made to those embodiments without departing from the principles of the invention as defined by the appended claims.

What is claimed is:

1. A method of pointing to objects in a display device displayed image, said displayed image comprising both objects and background, said method comprising:
    acquiring a displayed image generated by a display device, using a user aimed pointing device comprising a housing and at least one imaging sensor disposed substantially within said housing and configured to acquire an observed image of said displayed image;
    said displayed image comprising a plurality of displayed image pixels, wherein at least some of said displayed image pixels show said objects and other displayed image pixels show said background;
    wherein said at least some of said displayed image pixels that show said objects and other displayed image pixels that show said background are refreshed by said display device at the same rate;
    said observed image comprising a plurality of observed image pixels, wherein at least some of said observed image pixels show said objects, and other observed image pixels show said background;
    calculating pointing device position and orientation using the acquired observed image and a displayed image on the display device;
    wherein calculating pointing device position and orientation includes correlating the displayed image with the acquired observed image to generate correlation data, and computing pointing device position and orientation using the correlation data;
    wherein the calculating of pointing device position and orientation is performed by solving the inverse problem $$(x_p, v_p) = \frac{\operatorname{argmin}}{x_p, v_p} \|T(I_d; x_p, v_p) - I_o\|$$

where $x_p$ and $v_p$ are vectors of the position and orientation of the pointing device, respectively, $I_d$ is the displayed image, $I_o$ is the acquired image, $\|\cdot\|$ is a norm, and T is a mapping describing how the displayed image is observed by the sensor in the pointing device as a function of the pointing device position and orientation.

2. A method according to claim 1, wherein the correlation data includes correspondence between a pixel of the displayed image and a pixel of the acquired observed image, and a criterion of reliability of the correspondence.

3. A method according to claim 1, wherein the correlating and the computing are performed remotely from an acquiring location.

4. A method according to claim 1, wherein the correlating and computing are performed together.

5. A method according to claim 1, wherein the correlating includes extracting a first set of features from the observed image and a second set of features from the displayed image.

6. A method according to claim 5, wherein the first and second sets of features include dominant features.

7. A method according to claim 5, wherein the extracting is performed using a Smallest Univalue Segment Assimilating Nucleus (SUSAN) invariant feature detector.

8. A method according to claim 5, wherein the correlating further includes computing a descriptor for each feature of the first and second sets of features.

9. A method according to claim 8, wherein the computing of a descriptor is performed using scale-invariant feature transform (SIFT).

10. A method according to claim 5, wherein the correlating further includes matching the first set of features with the second set of features based on the descriptor for each feature.

11. A method according to claim 10, wherein the matching of the first set of features with the second set of features includes applying a RANdom Sample Consensus (RANSAC) algorithm.

12. A method according to claim 10, wherein the matching includes: finding, for each feature in the first set, a feature in the second set being a closest neighbor in a descriptor space; and rejecting a correspondence for a point, for which a ratio of distance in the descriptor space between a first nearest neighbor and a second nearest neighbor is larger than a threshold.

13. A method according to claim 12, wherein the distance in the descriptor space is at least one of a group including Euclidean distance, cosine distance, weighted Euclidean distance with weights determined offline by Principal Components Analysis (PCA) on a training set, and Mahalanobis distance.

14. A method according to claim 13, wherein the tracking is performed using a Kanade-Lucas algorithm.

15. A method according to claim 12, wherein the threshold is 0.6~0.8.

16. A method according to claim 1, wherein the correlating includes applying an optical flow algorithm.

17. A method according to claim 1, wherein the correlating includes tracking, in time, a feature from one of the first and second sets of features.

18. A method according to claim 1, wherein the calculating includes finding correspondence between the pixels of the displayed image $I_d$ and the acquired observed image $I_o$, said correspondence represented as a map between the vector of coordinates u in the displayed image domain and the vector of coordinates u' in the acquired image domain, and a criterion of reliability of the correspondence; using a parametric model $T(u; \theta)$ dependent on the vector of parameters $\theta$, mapping the coordinates u in the displayed image domain into the vector of coordinates u' in the acquired image domain to compute the best vector of parameters such that $u' \approx T(u; \theta)$; and computing the vectors of the position and orientation $x_p$ and $v_p$ of the pointing device from the parameters $\theta$.

19. A method according to claim 18, wherein the computing of the best vector of parameters is performed by solving the optimization problem $$\theta = \frac{\operatorname{argmin}}{\theta} \|T(u; \theta) - u'\|.$$

20. A method according to claim 1, further comprising: translating the calculated pointing device position and orientation into a local system of coordinates on the display device.

21. A method according to claim 20, wherein the pointing device position is expressed as a vector (x, y), and the orientation is expressed as a vector of azimuthal and elevation angles $(\theta, \phi)$.

22. A method according to claim 1, wherein the calculating is performed by a processing unit.

23. A method according to claim 22, further comprising: acquiring an observed image from the display device; transferring the acquired observed image to the processing unit; transferring the displayed observed image to the processing unit; calculating pointing device position and orientation using the acquired observed image and the image displayed on the display device.

24. A method according to claim 1, wherein the mapping T includes a geometric transformation of the image coordinates, and a photometric transformation of the image pixel values.

25. A method according to claim 24, wherein the geometric transformation is an affine transformation.

26. A method according to claim 1, wherein the solving of the inverse problem includes solving a parametric inverse problem $$\theta = \frac{\operatorname{argmin}}{\theta} \|T(I_d; \theta) - I_o\|$$

where $\theta$ is a vector of parameters, $\|\bullet\|$ is a norm, T is a parametric mapping describing the how the displayed image is observed by the sensor in the pointing device as a function of the parameters $\theta$, $I_d$ is the displayed image, and $I_o$ is the acquired image; and computing the vectors of the position and orientation $x_p$ and $v_p$ of the pointing device from the parameters $\theta$.

27. A method according to claim 1, wherein the inverse problem is solved after applying a transform to the displayed image $I_d$ and the acquired image $I_o$.

28. A method according to claim 27, wherein the transform includes at least one of the group of edge detection, frequency-domain (Fourier-like) transform, multiresolution (wavelet-type) transform, and local feature transform.

29. A method according to claim 1, further comprising: acquiring a time stamp of the observed image.

30. A method according to claim 1, further comprising: acquiring input data based on a user action; calculating output data based on the input data; and performing a response action based on the calculated output data.

31. A method according to claim 30, wherein the response action comprises displaying image data based on the calculated output data.

32. A method according to claim 30, wherein the response action is performed via the pointing device.

33. A method according to claim 30, wherein the user action is chosen from a group including pointing, shooting, striking, pushing, and pulling.

34. A method according to claim 30, wherein the user action is inferred from the motion of the pointing device.

35. The method of claim 1, wherein said pointing device additionally comprises a lens substantially within said housing and configured to focus said displayed image onto said at least one sensor.

36. A method of pointing to objects in a display device displayed image, comprising:

acquiring a displayed image generated by a display device, using a pointing device comprising a housing and at least one sensor disposed substantially within said housing and configured to acquire an observed image of said displayed image;

calculating pointing device position and orientation using the acquired observed image and a displayed image on the display device;

wherein calculating pointing device position and orientation includes correlating the displayed image with the acquired observed image to generate correlation data, and computing pointing device position and orientation using the correlation data;

wherein the calculating of pointing device position and orientation is performed by solving the inverse problem $$(x_p, v_p) = \frac{\mathrm{argmin}}{x_p, v_p} \|T(I_d; x_p, v_p) - I_o\|$$

where $x_p$ and $v_p$ are vectors of the position and orientation of the pointing device, respectively, $I_d$ is the displayed image, $I_o$ is the acquired image, $\|\bullet\|$ is a norm, and T is a mapping describing how the displayed image is observed by the sensor in the pointing device as a function of the pointing device position and orientation.

37. A method according to claim 36, wherein the mapping T includes a geometric transformation of the image coordinates, and a photometric transformation of the image pixel values.

38. A method according to claim 37, wherein the geometric transformation is an affine transformation.

39. A method according to claim 36, wherein the solving of the inverse problem includes solving a parametric inverse problem $$\theta = \frac{\mathrm{argmin}}{\theta} \|T(I_d; \theta) - I_o\|$$

where $\theta$ is a vector of parameters, $\|\bullet\|$ is a norm, T is a parametric mapping describing the how the displayed image is observed by the sensor in the pointing device as a function of the parameters $\theta$, $I_d$ is the displayed image, and $I_o$ is the acquired image; and computing the vectors of the position and orientation $x_p$ and $v_p$ of the pointing device from the parameters $\theta$.

40. A method according to claim 36, wherein the inverse problem is solved after applying a transform to the displayed image $I_d$ and the acquired image $I_o$.

41. A method according to claim 40, wherein the transform includes at least one of the group of edge detection, frequency-domain (Fourier-like) transform, multiresolution (wavelet-type) transform, and local feature transform.

* * * * *